(12) United States Patent
Viala et al.

(10) Patent No.: US 6,300,974 B1
(45) Date of Patent: Oct. 9, 2001

(54) PROCESS AND DEVICE FOR LOCATING AN OBJECT IN SPACE

(75) Inventors: Marc Viala, Guyancourt; Laurent Letellier, Fontenay-aux-Roses, both of (FR)

(73) Assignee: Commissariat A L'Energie Atomique, Paris (FR)

( * ) Notice: Subject to any disclaimer, the term of this patent is extended or adjusted under 35 U.S.C. 154(b) by 0 days.

(21) Appl. No.: 09/023,854

(22) Filed: Feb. 13, 1998

(30) Foreign Application Priority Data

Feb. 28, 1997 (FR) .................................................. 97 02426

(51) Int. Cl.⁷ .............................. H04N 7/18; G06T 15/00
(52) U.S. Cl. .............................................. 348/61; 382/154
(58) Field of Search .................................. 348/61, 62, 69, 348/81, 50, 82; 382/152, 154, 141, 20, 50, 94–95, 137, 140, 587; 356/142, 143, 375, 248; 250/589.1, 559.29; 345/419; 359/23; H04N 7/18; G06T 15/00

(56) References Cited

U.S. PATENT DOCUMENTS

| | | | |
|---|---|---|---|
| 4,183,055 | * 1/1980 | Burkhardt, Jr. et al. | 358/101 |
| 5,207,003 | 5/1993 | Yamada et al. . | |
| 5,398,292 | * 3/1995 | Aoyama | 382/22 |
| 5,521,036 | * 5/1996 | Iwamoto et al. | 340/22 |
| 5,611,000 | 3/1997 | Szeliski et al. . | |
| 6,009,188 | * 12/1999 | Cohen et al. | 382/154 |
| 6,023,523 | * 2/2000 | Cohen et al. | 382/154 |
| 6,028,955 | * 2/2000 | Cohen et al. | 382/154 |

FOREIGN PATENT DOCUMENTS

| | | | |
|---|---|---|---|
| 07098208 | 11/1995 | (JP) . | |
| 07098214 | 11/1995 | (JP) . | |
| 253322 | * 9/1998 | (JP) | G01B/11/00 |

OTHER PUBLICATIONS

Computer Vision and Image Understanding, vol. 63, No. 3, May, pp. 495–511, 1996; article No. 0037, D. Oberkampf, D. DeMenthon, L. Davis, "*Iterative Pose Estimation Using Coplanar Feature Points*" XP000597554.

* cited by examiner

*Primary Examiner*—Chris Kelley
*Assistant Examiner*—Tung Vo
(74) *Attorney, Agent, or Firm*—Burns Doane Swecker & Mathis

(57) ABSTRACT

An attempt is made to localize an object (1) with marks (3) in space, using a video camera (4). A search is made for traces of the marks (3) on the image, to deduce the directions of the marks (3) in the camera (4) view field and the position of the object (1). The algorithm used includes a step in which marks are approximately located by simple formulas, and then a step in which the estimate is improved by an error minimization calculation. Traces are modeled on the image to determine their position with high accuracy, better than the resolution pitch of the camera (4) which therefore does not need to give a very sharp image. The marks (3) are preferably passive marks and may or may not be reflecting, and do not emit any light. The system is not very sensitive to parasite lighting.

6 Claims, 3 Drawing Sheets

PROCESS AND DEVICE FOR LOCATING AN OBJECT IN SPACE

DESCRIPTION

The invention relates to a process and a device for locating an object in three-dimensional space and has a large number of applications such as robotics, mapping, aeronautics, etc., in which random movements of a moving solid must be identified for the purposes of position measurements, tracking, industrial process control or deformation measurements.

There are many technical solutions for making these types of measurement or inspection, but not all are easy to use in an industrial environment which may be hostile due to high temperatures and pressures, or radioactivity. Furthermore, not all solutions will be capable of quickly providing results with sufficient accuracy.

Known processes generally consist of equipping the object with targets aimed at by a sensor and the positions of which are known with respect to the sensor; the position of the object, including its orientation, is deduced by considering all the positions of the various targets. There are three categories of typical targets, namely magnetic, ultrasound and optical. The first usually consist of coils with pulsed operation to produce magnetic fields, and systems of this type are used together with magnetic sensors that determine field forces and angles. But they have the disadvantage of a long measurement lag, limited ranges and interferences that may occur between coils when there are ferrous materials inside the fields. Finally, the localization is not very precise.

Ultrasound targets transmit pulse sequences received by several sensors in order to measure the distance between each transmitter and each sensor and to deduce the position of the transmitters by triangulation. These solutions also have disadvantages related to a resolution defect, low precision and risk of interference due to echoes and other noise.

Optical solutions are based on the observation of marks made on the object and visible to cameras or analog image taking means. When several cameras are provided, a stereoscopic view of the environment and the object is made in order to deduce the direction between the object and each of the cameras by separately examining the position of marks on each image, and deducing the position of the object by triangulation. But these systems are expensive due to the large number of cameras, which must also be linked very precisely so that the localization quality is acceptable; and localization is limited to objects present in fairly restricted areas in space, and more precisely at the location at which the observation camera beams intersect, so that cameras must be disassembled and the system must be readjusted for observations at different distances.

Monocular localization is based on the use of a single camera. Some solution methods are analytic and make it necessary to solve an equation or a system of equations to determine the positions of marks starting from their images. They are fast, but sensitive to measurement noise.

Another category consists of iterative solutions in which the position of the marks on the object is estimated then corrected to minimize an error criterion between images recorded by the camera and the images that would be obtained if the marks were in the estimated position. These solutions are precise, not very sensitive to measurement noise and make it possible to use a variable number of marks, but they have the disadvantage that convergence may be fairly slow and the first estimate must be close to the solution, otherwise there is no guarantee of convergence.

One solution is described in the article "Model-based object pose in 25 lines of code" by DeMenthon and Davis, that appeared in the International Journal of Computer Vision, vol. 15, p. 123–141, 1995 and consists of obtaining a first estimate of the position of the marks on the object by an approximate but easy to use algorithm, and then correcting the estimated position by an iterative process in which the position estimates of the marks are projected onto the camera image before applying the approximate algorithm to these projections to give a new estimate of the position of the marks which is more accurate than the previous estimates.

The invention belongs to the family of monocular optical methods and includes the use of an iterative solution process using a first algorithm estimating a position very close to this article; but it has the distinction in particular that it uses a better final estimating algorithm less sensitive to measurement noise, as a result of a particular step improving the determination of the position of marks on the image, and by the nature of the marks that satisfies the requirement for precision in the final determination of the image position.

In its most general formulation, the invention relates to a process for positioning an object carrying marks in space, consisting of determining the positions of traces of marks on an image taken with a camera, and then calculating the positions of the marks with respect to the images taken using the positions of the traces on the image, characterized in that it comprises a step to improve the determination of the positions of traces on the image by modeling the traces using predetermined geometric shape functions and calculating the positions of the shape function that best correspond to the traces. This type of model can estimate the position of the traces with much better precision than the resolution pitch of the camera, so that excellent precision is obtained in the position of the marks, even with low resolution images.

The device used in the process according to the invention preferably comprises marks without any light sources, possibly but not necessarily reflecting, and the image taking means is in the form of a camera.

The invention will be described in more detail with reference to the following Figures which fully show one of several possible embodiments:

Figure 5:
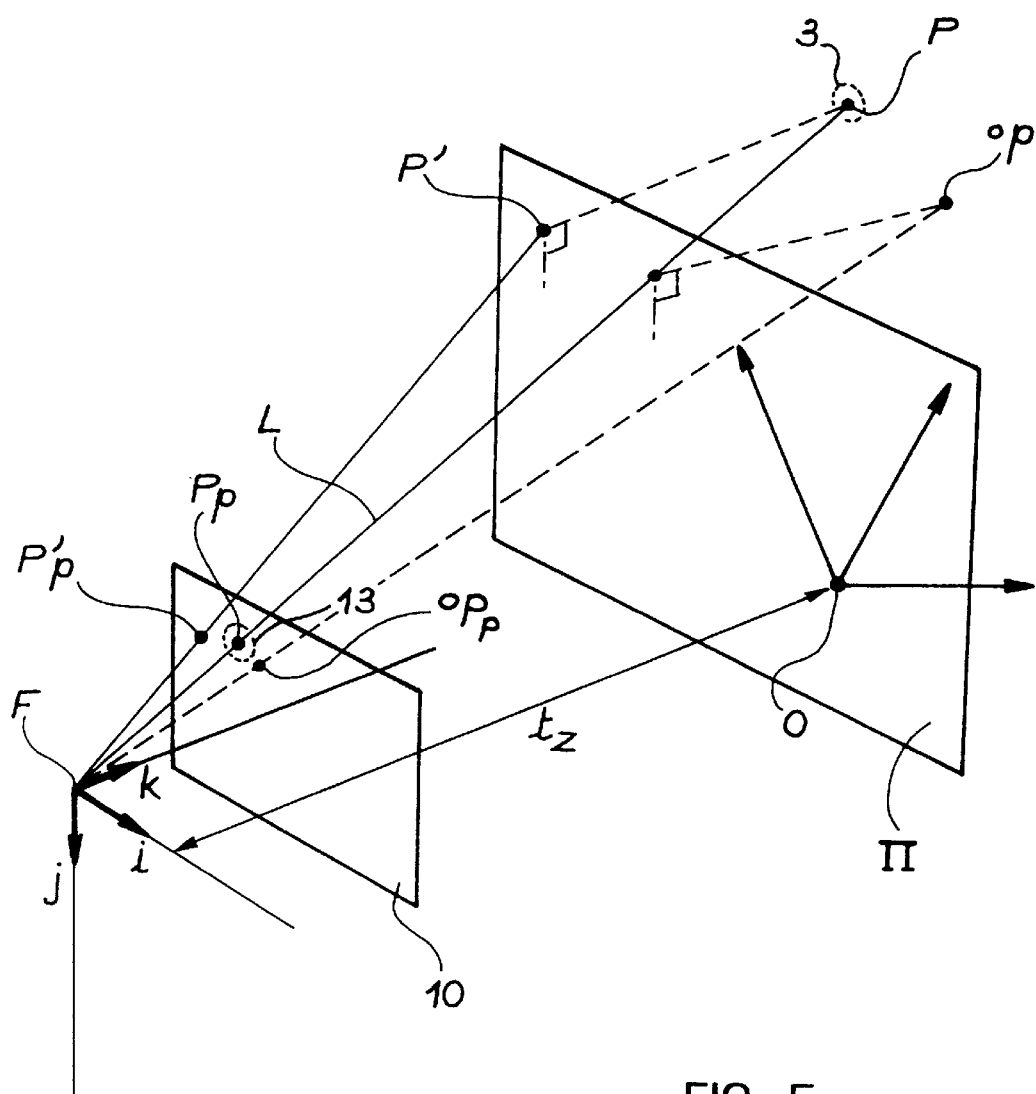

and FIG. 5 explains the positioning process.

Figure 1:
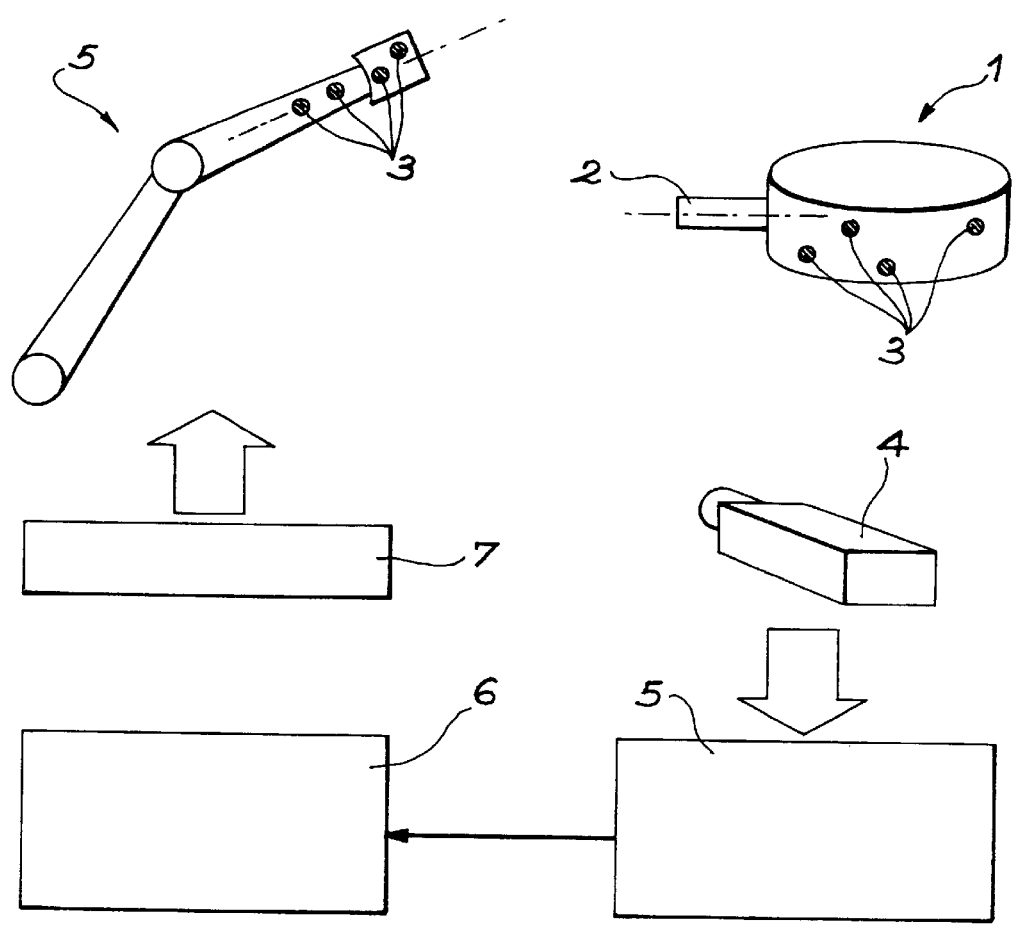
FIG. 1 shows a general view of the invention.

FIG. 1 shows an object that may be a tool 1 to be picked up by a handle 2 and which has marks 3 on a side facing an observation video camera 4; the marks 3 may consist of small patterns such as colored dots, or dots which reflect surrounding light. It is not essential that marks 3 have a defined and a unchangeable orientation with respect to the video camera 4, but they may be presented obliquely to the camera without affecting the detection precision, such that the invention can be applied to a very much larger number of situations.

These passive marks are much preferred to light marks generally used in practice and which are more easily visible but which have less clearly defined outlines, so that it is not possible to take full advantage of the algorithm for improving the position estimate described below.

Other marks 3 are also made on the surface of another object, namely an arm 5 of a robot or manipulated remotely by a computer, and which is attempting to pick up handle 2. The video camera 4 assists in the approach of tool 1 by localizing it and then periodically localizing arm 5 during its movement, in order to be able to give the relative position of the two objects each time. The video camera 4 is connected to a calculation unit 5 that determines this information and that is itself connected either to an arm control device 5, or for a remote manipulated arm, to a display unit 6 visible to the operator who then efficiently acts on the arm 5 control station 7.

Figure 2:
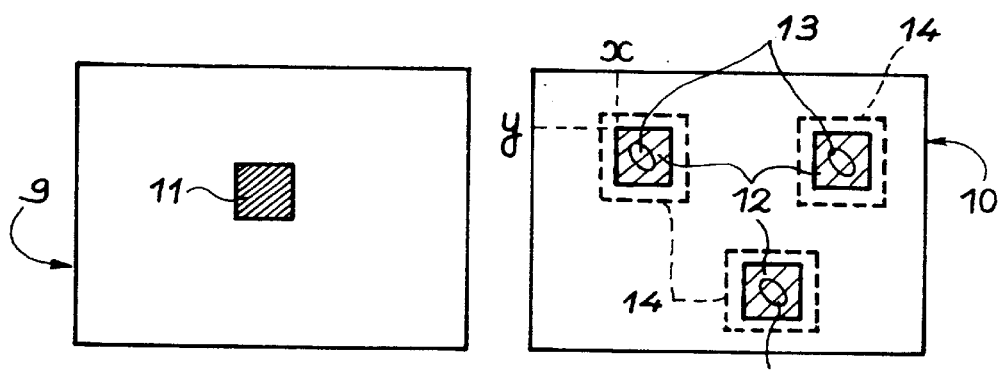
FIG. 2 illustrates the technique used to search on the image for traces of the marks on the object.

The first step in the localization process is to search for the trace of marks 3 on the image taken by the video camera 4. In this step, imagettes or portions of images each containing a trace of one of marks 3, are identified. FIG. 2 shows that the procedure is to correlate image 10 on video camera 4 with a previously taken calibration image 9. If it is found that the trace of one of the marks 3 was included within the outline of a portion or reference imagette 11 of the calibration image 9, the localization program creates imagettes 12 with the same outline at coordinates x and y on image 10 in sequence, and calculates the correlation C between the light intensity of imagettes 11 and 12 using the following formula (1):

$$C(x, y) = \frac{Cov(M_o, M_k)}{\sigma(M_o)\sigma(M_k)} = \frac{E(M_o M_k) - E(M_o)E(M_k)}{\sqrt{E(M_o^2) - E(M_o)^2}\sqrt{E(M_k^2) - E(M_k)^2}} \quad (1)$$

where cov is the covariance, E is the mathematical expectancy and σ a is the standard deviation of the light intensity. $M_o$ and $M_k$ represent the contents or light patterns of imagettes 11 and 12. This calculation is repeated for all positions of imagette 12, making x and y vary. A correlation table is then obtained for image 10, the points of the table being assigned a number between −1 and +1 where −1 means anti-correlation between patterns $M_o$ and $M_k$ for the x and y coordinates considered, 0 means no correlation and +1 means perfect correlation. Perfect correlation occurs when the imagette 12 is identical to the reference imagette 11; correlation is specifically used to identify the locations of better correlation with imagette 11 on image 10 by reading a correlation table; it is then possible to isolate a number of imagettes 12 on image 10, each of then contains the trace 13 of marks 3 on the object aimed at. The reference imagette 11 may be unique for several imagettes 12 if marks 3 are identical; otherwise an imagette 12 is associated with a corresponding reference imagette 11.

However, some precautions have to be taken to make the process more attractive and reliable. There is no doubt that these correlation calculations are long and expensive. This is why they are actually done on reduced images, which simply contain a selection of points (pixels) from the original image. Points corresponding to a larger number of candidate imagettes then the imagettes 12 actually searched for are selected from the reduced correlation table thus obtained. A verification correlation is carried out on the complete candidate imagettes, in other words after reinserting all points that had been eliminated in forming the reduced image, in order to make a second selection among them. The finally selected imagettes 12 are those which have the best verification correlation with the reference imagette 11. These precautions protect against risks of error related to specific operating conditions in which parasite light or other effects may mislead the system such that traces 13 are identified at these locations instead of the right locations. Furthermore, verification correlations may be calculated several times for each of the imagettes 12, by moving them each time within the outlines of a window 14 with predetermined dimensions built around each of the candidate imagettes. Obviously, the best correlation in window 14 will be used to define imagette 12. The risk of truncating the trace 13 by badly framing it in imagette 12 is then very small.

An important element of the invention consists of estimating the position of traces 13 of marks 3 on the imagettes 12 with high precision; the proposed process is capable of locating this position with an accuracy of less than a pixel, in other words with better precision than the width of a dot in the image. It is then possible to obtain satisfactory results for the position of an object, even with a low resolution video camera 4, which is less expensive and with which the images can be used faster. The correlation calculation between imagette 12 of trace 13 and a primitive image such as imagette 11 could be used as a basis, for example, to calculate the position of the center of the trace 13 on the imagette 12. But this type of method quickly becomes unusable when the object 1 has rotated and its marks 3 are seen at a different incidence so that they are deformed on imagette 12. This is why it is proposed to model traces 13 on imagette 12 by a formula such as the following (2):

$$I(x, y) = a + bx + cy + \\ d \exp\left(\frac{1}{2(1 - r_{xy}^2)}\left(\frac{(x - m_x)^2}{\sigma_x^2} + \frac{(y - m_x)^2}{\sigma_y^2} - \frac{(x - m_x)(y - m_y)}{\sigma_x \sigma_y}\right)\right) \quad (2)$$

where I is the light intensity on the imagette 12, a, b, c and d are constants, the first three of which are used to estimate the light intensity of the imagette 12 background, and d is used to estimate the global light intensity of the trace 13; $m_x$, $m_y$ express the coordinates of the center of the trace 13, $\sigma_x$ and $\sigma_y$ are its widths in the main axes which may be oblique with respect to the main axes of the imagette 12, and $r_{xy}$ expresses the spread of the trace.

Figure 3:
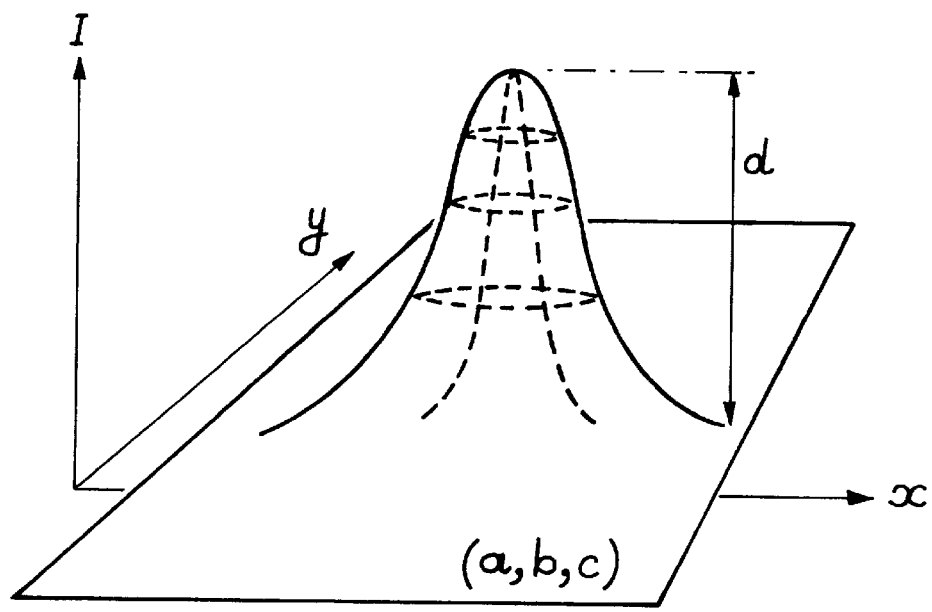
FIGS. 3 and 4 illustrate a model of the trace.
Figure 4:
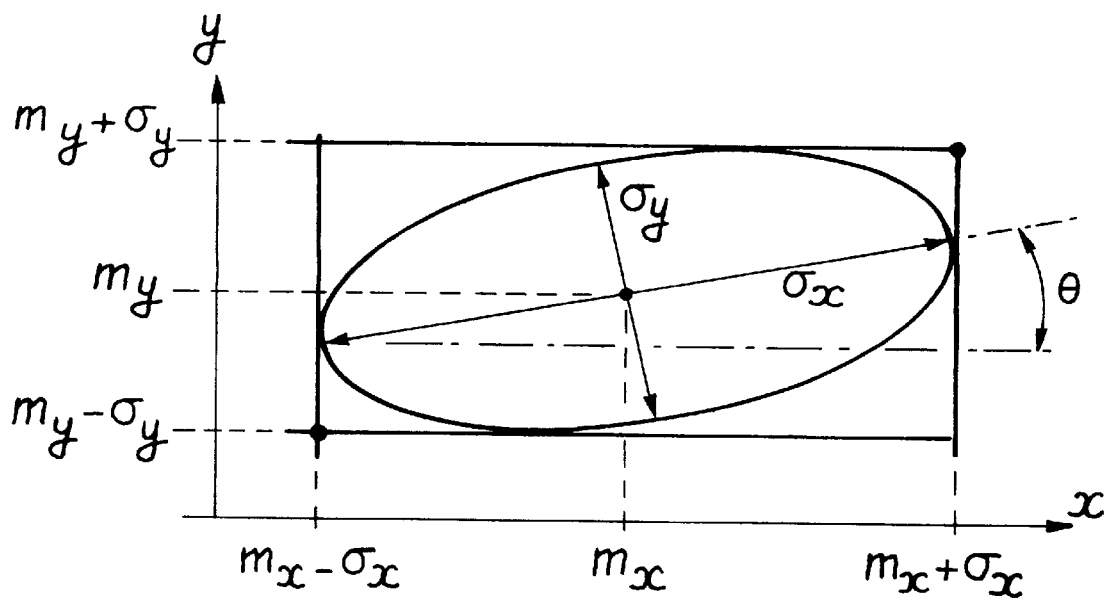

Mathematically, a, b and c are the coefficients of a plane and d is the height of a gaussian function with an elliptic two-dimensional section in which $m_x$ and $m_y$ are the averages, $\sigma_x$ and $\sigma_y$ are the standard deviations and $r_{xy}$ is the correlation. FIGS. 3 and 4 give a graphic representation of this function.

It can be seen that this model takes account of the fact that trace 13 becomes narrower on imagette 12 due to the mark 3 becoming further away and its deformation due to rotation of the object 1. If we denote the light intensity measured on the imagette points as $\hat{I}_{(xy)}$ the task consists of minimizing the function $C_{mi}$, in the following formula (3):

$$C_{\min}(a, b, c, d, m_x, m_y, \sigma_x, \sigma_y, r_{xy}) = \sum_{xyel} (I(x, y) - \hat{I}(x, y))^2 \quad (3)$$

by varying the variables in this function, in other words the modeling parameters, so that the light intensities given by it coincide with the measured values as closely as possible. A precise model of trace 13 is then obtained; in particular, it is possible to deduce the center using the values of $m_x$ and $m_y$ and consequently to use the preliminary calibration of the images of video camera 4 by photogrammetry, to obtain the direction of mark 3 associated with imagette 12 considered with respect to video camera 4.

The model given above is suitable for circular marks 3, but is can easily be transposed to different marks of a simple shape.

The next step is to determine the position of marks 3 with respect to the video camera 4. The following explanation should be read with reference to FIG. 5.

Assuming that the geometric distortions caused by the objective of the video camera 4 have been corrected, which can also be done by preliminary calibration of video camera 4 by photogrammetry, point P such as the center of a mark 3 is located on a projection line L passing through the center Pp of the corresponding trace 13 on the image 10 and through a focal point F. Let i, j and k be the axes of the coordinate system of the camera that has its origin at focal point F, the axis k being perpendicular to the image 10. All points in space observed by the video camera 4 are projected onto the image 10 by a line passing through the focal point F; this convergent projection is called a "perspective". The position of points Pp, the centers of traces 13, can therefore be predicted when the object 1 occupies a given position in the field of video camera 4; the problem consists of finding the reverse projection relations that make points Pp pass through points P. But it is found that the rigorous reverse projection relations obtained by inverting the projection relations used to calculate the coordinates of points Pp from the coordinates of points P, cannot easily be used since they do not consist of a system of linear equations.

This is why it is recommended that a first evaluation of the position of points P should be made; this first evaluation is approximate, but it may be obtained easily and can then be used as a starting point for a convergence procedure towards the actual solution. The selected principle consists of assuming that points P are projected onto the image 10 in two steps, firstly by an orthogonal projection onto a point P' in an intermediate plane $\pi$ parallel to the plane of image 10, followed by a perspective projection of this point P' toward focal point F with gives a point Pp' on image 10. This dummy projection point is adjacent to the real projection point Pp. The first evaluation of the position of points P consists of applying a reverse projection which is the inverse of the dummy projection that has just been described, to points Pp on image 10; the points thus obtained are denoted °P.

Having described this principle, we will now describe details of the calculations used more precisely.

The situation of object 1 may be represented by a rotation R and a translation t conform with the following matrices (4) that transform the coordinate system of the video camera 4 defined above, to a coordinate system related to the object 1:

$$t = (t_x, t_y, t_z)^T \quad (4)$$

$$R = \begin{pmatrix} i_x & i_y & i_z \\ j_x & j_y & j_z \\ k_x & k_y & k_z \end{pmatrix} = \begin{pmatrix} i^T \\ j^T \\ k^T \end{pmatrix}$$

where $t_x$, $t_y$ and $t_z$ are translation coordinates expressed in the i, j and k axes of the video camera 4 coordinate system and i, j and k are the unit vectors of the coordinate system of the video camera 4 expressed in the coordinate system of the object 1.

The plane $\pi$ is chosen such it contains the origin O of the coordinate system of the object 1, which implies that the distance between the focal point F and the plane $\pi$ is equal to the value $t_z$.

Let us use $o_x$, $o_y$ and $o_z$ to denote the coordinates of point P in the coordinate system of the object 1, and $\bar{u}$ and $\bar{v}$ to denote the coordinates of point P'p on image 10, the following relations (5) can then be obtained:

$$\frac{i \cdot (°x, °y, °z)^T + t_x}{t_z} = \bar{u} \quad (5)$$

$$\frac{j \cdot (°x, °y, °z)^T + t_y}{t_z} = \bar{v}$$

These equations may be generalized to a number n of points P on the object 1 as follows (6):

$$A \begin{pmatrix} I_1 \\ I_2 \\ I_3 \\ I_4 \end{pmatrix} = \bar{u} \quad (6)$$

$$A \begin{pmatrix} J_1 \\ J_2 \\ J_3 \\ J_4 \end{pmatrix} = \bar{v}$$

where notations I, J, A, $\bar{u}$, $\bar{v}$ are given by the following equations (7):

$$\begin{cases} I_1 = i_x/t_z \\ I_2 = i_y/t_z \\ I_3 = i_z/t_z \\ I_4 = t_x/t_z \\ J_1 = j_x/t_z \\ J_2 = j_y/t_z \\ J_3 = j_z/t_z \\ J_4 = t_y/t_z \end{cases} \quad (7)$$

$$A = \begin{pmatrix} °x_1 & °y_1 & °z_1 & 1 \\ \vdots & \vdots & \vdots & \vdots \\ °x_n & °y_n & °z_n & 1 \end{pmatrix}$$

$$\bar{u} = \begin{pmatrix} \bar{u}_1 \\ \vdots \\ \bar{u}_n \end{pmatrix}$$

$$\bar{v} = \begin{pmatrix} \bar{v}_1 \\ \vdots \\ \bar{v}_n \end{pmatrix}$$

The next step is to calculate the quantities I and J, which is done using the following formulas (8):

$$\begin{pmatrix} I_1 \\ I_2 \\ I_3 \\ I_4 \end{pmatrix} = B\bar{u}' \quad (8)$$

$$\begin{pmatrix} J_1 \\ J_2 \\ J_3 \\ J_4 \end{pmatrix} = B\bar{v}'$$

where the matrix B is a pseudo inverse of A, in other words $B = (A^T A)^{-1} A^T$.

The parameters i, j, k and $t_x$, $t_y$, $t_z$ in the matrices R and t are then calculated simply by the following sequence of steps:

calculate the normals $n_I = \|(I_1, I_2, I_3)^T\|$ and $n_J = \|(J_1, J_2, J_3)^T\|$;

calculate the average normal $n = (n_I + n_J)/2$;

calculate $I = (I_1, I_2, I_3)^T/n_I$ and $j = (J_1, J_2, J_3)^T/n_J$;

calculate k as the vector product of the vectors i and j;

calculate the component $t_z = 1/n$ calculate $t_x = I_4 t_z$ and $t_y = J_4 t_z$.

When the position of points °P giving an estimate of the position of points P has thus been obtained by these calculations, it needs to be corrected due to the error of principle explained in the commentary to FIG. 5. Points °P are projected onto the plane of the image 10 along a line F towards the focal point F. The coordinates $\hat{u}$ and $\hat{v}$ of the projection point °Pp are given by the following formulas (9):

$$\frac{i \cdot (°x, °y, °z)^T + t_x}{k \cdot (°x, °y, °z)^T + t_z} = \hat{u} \qquad (9)$$

$$\frac{j \cdot (°x, °y, °z)^T + t_y}{k \cdot (°x, °y, °z)^T + t_z} = \hat{v}$$

which should be compared with the previous approximate but simpler formulas (5).

The final estimate of the object position parameters 1, in other words of the values of the coefficients of matrices R and t which give the position and orientation of the coordinate system of object 1, is obtained by minimizing the root mean square error between the coordinates $\bar{u}$ and $\bar{v}$ measured on points Pp of the image 10 and coordinates $\hat{u}$ and $\hat{v}$ of the projections °Pp of points °P calculated using the previous formulas (9). The uncertainties on the coordinates of points Pp estimated by modeling the trace 13 are taken into account (these uncertainties are represented by a matrix Λ of coefficients that may be estimated in advance). In other words, an attempt is made to minimize the quantity $C_{min}$ given by the following formula (10):

$$C_{min}(R, t) = \sum_{i=1}^{n} \left( (\bar{u}_1, \bar{v}_1) - (\hat{u}_1, \hat{v}_1) \right)^T \Lambda^{-1} \left( (\bar{u}_1, \bar{v}_1) - (\hat{u}_1, \hat{v}_1) \right) \qquad (10)$$

An iterative approach is used, each time moving points °P as a function of their projections °Pp, on image 10, until these projections have sufficiently converged towards the centers Pp of the traces 13.

What is claimed is:

1. Process for positioning an object (1) carrying marks (3) in space, consisting of determining the positions of traces (13) of marks (3) on an image (10) taken with a camera (4), and then calculating the positions of the marks (3) with respect to the camera (4) using the positions of the traces (13) on the image (4), characterized in that it comprises a step to improve the determination of the positions of the traces (13) on the image (10) by modeling the traces (13) using predetermined geometric shape functions and calculating the positions of the shape function that best correspond to the traces, the correspondence being calculated by minimizing a difference in light intensity on the image between the trace (13) and the geometric shape function, the predetermined geometric shape function including variable parameters for taking account of deformation and dimension of aspects of the marks (3) due to distance and rotation of the object (1), the geometric shape function including a gaussian function with variable parameters for modeling the light intensity within the shape function.

2. Process for positioning an object (1) carrying marks (3) in space, consisting of determining the positions of traces (13) of marks (3) on an image (10) taken with a camera (4), and then calculating the positions of the marks (3) with respect to the camera (4) using the positions of the traces (13) on the image (4), characterized in that it comprises a step to improve the determination of the positions of the traces (13) on the image (10) by modeling the traces (13) using predetermined geometric shape functions and calculating the positions of the shape function that best correspond to the traces, the correspondence being calculated by minimizing a difference in light intensity on the image between the trace (13) and the geometric shape function, the geometric shape function including a gaussian light intensity function with variable parameters, characterized in that it comprises a step in which the image (10) is reduced, using only some of the dots in the image (10), then searching for traces on the reduced image by correlating it with a reference image (11) before carrying out the step to improve the determination of the positions of traces using the complete image.

3. Process for positioning an object (1) carrying marks (3) in space, consisting of determining the positions of traces (13) of marks (3) on an image (10) taken with a camera (4), and then calculating the positions of the marks (3) with respect to the camera (4) using the positions of the traces (13) on the image (4), characterized in that it comprises a step to improve the determination of the positions of the traces (13) on the image (10) by modeling the traces (13) using predetermined geometric shape functions and calculating the positions of the shape function that best correspond to the traces, the correspondence being calculated by minimizing a difference in light intensity on the image between the trace (13) and the geometric shape function, the geometric shape function including a gaussian light intensity function with variable parameters, characterized in that it includes an extraction of portions (12) of image (10) each comprising one of the traces (13) and an adjustment of the position of image portions (12) in larger windows (14) so that they correctly surround the traces (13), maximizing correlations of image portions (12) successively adjusted in position and a reference image (11) containing a trace of a mark, before carrying out the step to improve the determination of the positions of the traces.

4. Process for positioning an object (1) carrying marks (3) in space, consisting of determining the positions of traces (13) of marks (3) on an image (10) taken with a camera (4), and then calculating the positions of the marks (3) with respect to the camera (4) using the positions of the traces (13) on the image (4), characterized in that it comprises a step to improve the determination of the positions of the traces (13) on the image (10) by modeling the traces (13) using predetermined geometric shape functions and calculating the positions of the shape function that best correspond to the traces, the correspondence being calculated by minimizing a difference in light intensity on the image between the trace (13) and the geometric shape function, the geometric shape function including a gaussian light intensity function with variable parameters, characterized in that positions of marks (3) are calculated by an algorithm carrying out a reverse projection of traces (13) on a plane (π) parallel to a plane of the image (10) along lines converging towards a single focal point (F), and then perpendicularly to the said parallel plane in space.

5. Process for positioning an object (1) carrying marks (3) in space, consisting of determining the positions of traces (13) of marks (3) on an image (10) taken with a camera (4), and then calculating the positions of the marks (3) with respect to the camera (4) using the positions of the traces (13) on the image (4), characterized in that it comprises a step to improve the determination of the positions of the traces (13) on the image (10) by modeling the traces (13) using predetermined geometric shape functions and calculating the positions of the shape function that best correspond to the traces, the correspondence being calculated by minimizing a difference in light intensity on the image between the trace (13) and the geometric shape function, the geometric shape function including a gaussian light intensity function with variable parameters, characterized in that the positions of marks (3) are calculated by an algorithm carrying out a reverse projection of traces (13) on a plane ($\pi$) parallel to a plane of the image (10) along lines converging towards a single focal point (F), and then perpendicularly to the said parallel plane in space, characterized in that the marks calculated by the algorithm are projected onto the plane of the image (10) along lines converging towards the focal point (F) by calculations, to give check projections, and positions of the calculated marks are corrected to minimize an error criterion between the check projections and the traces.

6. Device for embodying the process according to claim 1, characterized in that the marks (3) have no light source and that the image taking device is a camera (4).

* * * * *